United States Patent
Etnyre

[19]

[11] Patent Number: 5,941,351
[45] Date of Patent: Aug. 24, 1999

[54] SUSPENSION STRUT ASSEMBLY

[75] Inventor: Edwin L. Etnyre, Warren, Mich.

[73] Assignee: Chrysler Corporation, Auburn Hills, Mich.

[21] Appl. No.: 08/823,284

[22] Filed: Mar. 21, 1997

[51] Int. Cl.⁶ .................................................... F16F 9/00
[52] U.S. Cl. ................................ 188/322.17; 188/322.19
[58] Field of Search ..................... 188/322.17, 322.19, 188/315, 284; 384/52, 53, 58

[56] References Cited

U.S. PATENT DOCUMENTS

| | | |
|---|---|---|
| 2,325,430 | 7/1943 | Setz . |
| 2,992,013 | 7/1961 | Zeigler et al. . |
| 3,151,706 | 10/1964 | Dillenburger et al. ............ 188/322.19 |
| 4,108,469 | 8/1978 | Schwarzbich . |
| 4,200,307 | 4/1980 | Szabo'. |
| 4,474,363 | 10/1984 | Numazawa et al. . |
| 4,531,759 | 7/1985 | Rezanka et al. . |
| 4,541,744 | 9/1985 | Lederman . |
| 4,552,467 | 11/1985 | Takei et al. . |
| 4,618,130 | 10/1986 | Veglia . |
| 4,673,192 | 6/1987 | Krehan et al. . |
| 4,756,517 | 7/1988 | Kakimoto . |
| 4,817,983 | 4/1989 | Virani . |
| 4,909,642 | 3/1990 | Hoermandinger . |
| 4,966,257 | 10/1990 | Axthammer . |
| 5,044,648 | 9/1991 | Knapp . |
| 5,301,974 | 4/1994 | Knapp ............................ 188/322.17 X |
| 5,350,185 | 9/1994 | Robinson . |
| 5,449,155 | 9/1995 | Mack . |
| 5,454,585 | 10/1995 | Dronen et al. . |

FOREIGN PATENT DOCUMENTS

| | | |
|---|---|---|
| 3445461 | 6/1986 | Germany . |
| 4115557 | 12/1991 | Germany . |
| 58-88243 | 5/1983 | Japan . |
| 1203435 | 8/1970 | United Kingdom . |

*Primary Examiner*—Robert J Oberleitner
*Assistant Examiner*—Melanie Talavera
*Attorney, Agent, or Firm*—Roland A. Fuller III

[57] ABSTRACT

A vehicle suspension strut includes a generally cylindrical housing having a first end and a second end. The housing defines a generally longitudinal axis extending between the first and second ends, and a housing interior for containing a fluid. A first closure closes the first end of the housing and includes a piston receiving aperture. A second closure is provided for closing the second end of the housing. A piston is extendable through the piston receiving aperture, and is moveable in an axial direction between a fully collapsed position and an extended position. The piston includes a first end disposed adjacent to the first end of the housing and exteriorly of the housing exterior, and a second end disposed adjacent to the second end of the housing and within the housing interior. The piston also includes an insertable portion having a length L. A piston head is fixedly coupled to the piston adjacent to the second end thereof, and includes a plurality of apertures through which the fluid can pass at a controlled rate. A bearing assembly is disposed within the housing adjacent to the first end thereof for facilitating axial movement of the piston between its extended and collapsed positions. The bearing assembly includes at least two axially extending arrays of bearing members that engage the piston over a distance sufficient to absorb radially directed side-load forces, thereby substantially eliminating the need for a side-load force absorbing member at the second end of the piston.

27 Claims, 6 Drawing Sheets

SUSPENSION STRUT ASSEMBLY

TECHNICAL FIELD OF THE INVENTION

The present invention relates to vehicle suspension systems, and more particularly to an improved suspension strut assembly for a vehicle suspension system.

BACKGROUND OF THE INVENTION

Strut members have been used as integral components of vehicle suspension systems for quite some time. Examples of vehicle suspension struts are shown in the following patents: Hassan U.S. Pat. No. 4,804,169; McClellan U.S. Pat. No. 5,078,370; Weaver et al. U.S. Pat. No. 5,308,048; Perkins U.S. Pat. No. 5,228,717; Pacis U.S. Pat. No. 4,260,176; Perkins U.S. Pat. No. 5,145,204; Kakimoto U.S. Pat. No. 4,756,517; Taihou Kogyo, K K Japanese Patent Specification No. 58-88243(A) and Gee British Patent Specification No. 1,203,435.

McPherson type strut suspension systems typically include a suspension strut that comprises a tubular housing assembly having an outer casing, a cylindrical piston member received in the upper end of the housing and an exteriorly disposed helical suspension spring that surrounds a portion of the casing. The helical spring usually comprises the suspension spring for the vehicle. A mounting tower having a generally radially extending portion is provided for use as a seat by one end of the spring. A spring support member can be formed on the casing to support the lower end of the helical spring.

The strut is placed between a relatively fixed (sprung) portion of the vehicle, such as a body panel or frame member, and a movable (unsprung) portion of the vehicle such as a plate member or knuckle which ultimately attaches the strut to the vehicle wheel. In most strut suspension systems, the axially movable piston is connected to the body frame member, and the casing is attached to the unsprung member, such as the wheel.

One challenge faced by designers of suspension systems is to reduce the amount of space required for the suspension system. In this regard, car manufacturers have found that the consumers prefer vehicles having increased usable space, such as interior room and trunk room. If the space required by the suspension system can be reduced, the usable space within the vehicle can be increased.

To some extent, suspension system designers are constrained in their ability to reduce the size of the suspension system because of the function performed by the suspension system. For example, the strut must have a housing and piston that are sufficiently long enough to accommodate the vertical travel of the wheel as it moves up and down during vehicle travel. As such, the strut housing must be long enough to accommodate the full travel (stroke distance) of the piston between its fully collapsed position (i.e. that point when the piston is fully inserted within the interior of the housing) and its fully extended position (i.e. the position wherein the piston is fully extended to its maximum extent outside the housing).

Another functional constraint that affects the ability of the designer to reduce the length of the suspension strut (and hence reduce its size) is the radially directed, side loading forces that are exerted upon a strut. Although the predominant forces exerted upon a strut are those axially directed forces which are exerted by the vehicle wheel moving upwardly and downwardly, radially directed side loading forces are also exerted on the suspension strut. One source of such side loading forces is braking the vehicle.

It is important to be able to handle these side loading forces without reducing the ability of the strut's piston to slide within the cylinder of the strut housing. Additionally, by making a strut which is capable of handling higher side loading forces, the suspension designer has more flexibility to choose alternate suspension geometries, which although imposing greater side loading forces, requires less space.

In a typical suspension prior art strut housing, the upper (first) end of the housing includes an aperture for receiving the piston member. A bushing is placed adjacent to the aperture for slidably receiving the piston member. Because of the presence of bushing, the side loading forces that are exerted on the strut will tend to cause the piston member to pivot about a radially extending axis defined by the bushing at the first end of the housing. This pivoting action of the first end of the piston in a radial direction causes the second (lower) end of the piston member to move in an opposite radial direction. To deal with these side loading forces, strut designers typically employ a side load force absorbing member that is disposed near the second (lower) end of the piston. In most known struts, this side load force absorbing member consists of a bushing member. To prevent the lower bushing member from becoming pinched against the side of the housing interior, and thus being prevented from moving easily within the housing interior, a stop member is usually placed at a spaced relation from the bushing member. However, one difficulty encountered when increasing the space between the stop member and the bushing is that as the stop member defines the limit of travel of the piston, any increase in distance between the stop member and the bushing necessarily increases the length of the strut member.

It is therefore an object of the present invention is to provide a suspension strut which has a reduced overall length, when compared to prior art struts, but which still maintains the same travel distance as prior art struts.

It is a further object of at least one embodiment of the present invention to provide a suspension strut design which is more durable than known strut assemblies.

It is also an object of the present invention to provide a suspension strut that is capable of satisfactorily handling greater side loading forces without compromising the ability of the strut's piston to slide within the cylinder of the strut housing.

The capability of a strut to absorb greater side loading forces provides the suspension designer with a greater flexibility in the overall design of the suspension configuration, by allowing the designer more freedom in positioning the strut.

To understand why this occurs, it is useful to understand the nature of the forces that are exerted on the strut and suspension system.

Figure 12:
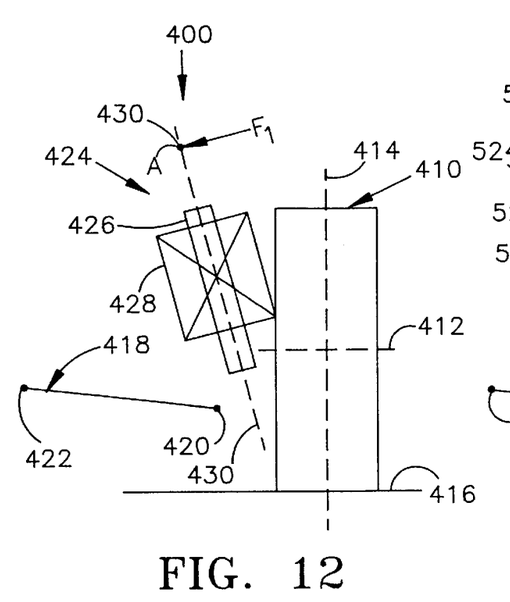
FIG. 12 is a schematic representation of a suspension system for illustrating a particular suspension geometry.
Figure 13:
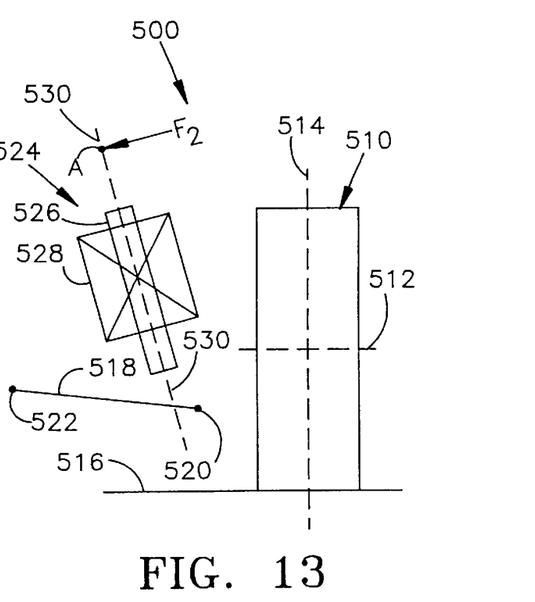
FIG. 13 is a schematic representation of a suspension system for illustrating an alternative suspension geometry.
Figure 14:
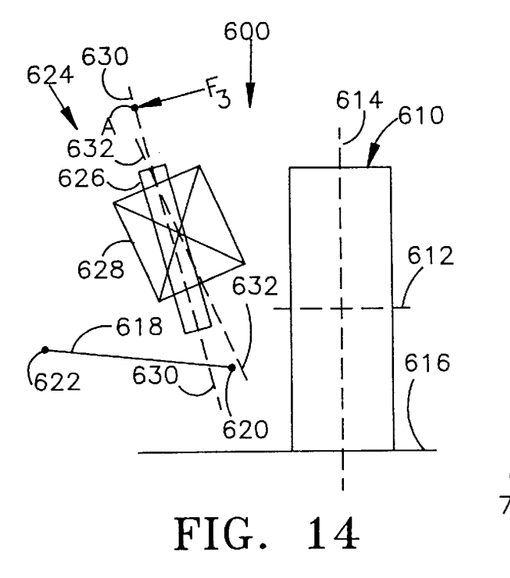
FIG. 14 is a schematic representation of a suspension system for illustrating another alternative suspension geometry.

Turning now to FIGS. 12–15, the geometric relationship between the various suspension components is shown schematically. FIGS. 12–14 show examples of suspension systems that can be achieved with the new, shorter strut of the present invention.

FIG. 12 shows a suspension system 400 where a tire/wheel combination 410 has an axis 412 about which it rotates, and an imaginary line 414 which is perpendicular both to the axis 412 and to the road surface 416 upon which tire 410 travels. A pair of lateral links (shown schematically as a single link) 418 have an inboard end 422 which is connected to a spring component of the vehicle body or frame, and an outboard end 420 that is connected to a knuckle (not shown) of the suspension assembly. The strut assembly 424 includes a piston-containing strut member 426 and a spring member 428 which exteriorly surrounds the strut member 426. In the embodiment shown in FIG. 12, the strut member 426 and spring 428 are disposed coaxially, so that both share a common centerline or axis 430. During operation of the suspension system 400, side loading forces are directed on the strut member 426 in a direction indicated generally by arrow $F_1$. In the embodiment shown in FIG. 12, it will be noted that the outboard end 420 of the lateral link is disposed inboard of the centerline 430.

The suspension systems 500, 600 of FIGS. 13 and 14 represent the same type of components in a different suspension geometry. The components of FIGS. 13 and 14 include a tire and wheel assembly 510, 610, having an axis 512, 612, respectively, and an imaginary line 514, 614 that is perpendicular to the respective axes 512, 612 and the road surfaces 516, 616. Lateral link pairs 518, 618 have respective outboard ends 520, 620 and inboard ends 522, 622. The respective strut assemblies 524, 624 each include a piston containing strut member 526, 626 and a radially outwardly disposed spring member 528, 628. Each of the respective strut members 526, 626 has a centerline (axis) 530, 630. In the embodiment shown in FIG. 13, the spring 528 and strut member 526 are coaxial, and as such share a common centerline 530. In the embodiment shown in FIG. 14, the spring 628 and strut 626 are positioned at offset angles. As such, the centerline 630 of the strut member 626 is offset from and is different than the centerline (axis) 632 of the spring 628. It should also be noted that the outboard ends 520, 620 of the respective lateral link pairs 518, 618 are disposed relatively outboard of the respective center lines 530, 630 of the strut members. However, although the outboard ends 520 of link pair 518 are disposed outboard of the centerline 530 of spring 528 (FIG. 13), the outboard ends 620 of link pair 618 are disposed relatively inboard of the centerline 632 of offset spring 628.

The ramifications of these particular geometries are discussed below.

In the embodiment shown in FIG. 12, the center line 430 of the spring 428 is directed relatively outwardly of the outboard end 420 of the lateral link 418. This differs from the embodiment shown in FIG. 13 wherein the center line 530 of the spring 528 is disposed relatively inboard of the outboard end 520 of the lateral link 518. Because of this, the relative side loading force $F_1$ that is directed against the strut 426 is relatively less than the side loading force $F_2$ exerted against strut 526 of FIG. 13. Although the suspension geometry shown in FIG. 13 has a "size" advantage, when compared to that shown in FIG. 12, because of the reduced amount of space that it requires, it also has a drawback. In particular, since the side loading force $F_2$ that is exerted on strut 526, is greater than the side loading force $F_1$ directed on strut 426 (at FIG. 12), one desiring to use the suspension geometry shown in FIG. 13, would need to design a strut 526 that is capable of carrying more side loading force.

Figure 15:
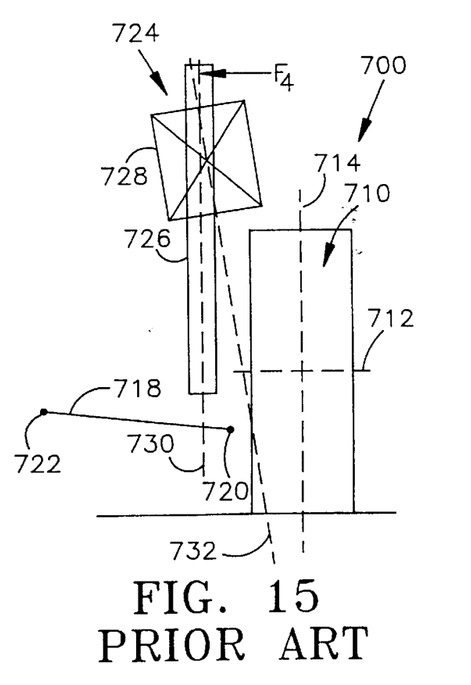
FIG. 15 is a schematic representation of a suspension system for illustrating a prior art suspension geometry.

Present, prior art suspension systems are designed to reduce the side loading force $F_1$ to a level that is within the load limits that existing struts are capable of handling, by utilizing a configuration similar to the one shown in FIG. 15. The suspension geometry shown in FIG. 15 helps to reduce side loading force by offsetting the center line 732 of the spring 728 from the center line 730 of the strut 726. This causes the side loading force $F_4$ of the spring 728 to be directed relatively outboard of the outboard ends 720 of the lateral link pair 718. Although this type of configuration does help to reduce the side loading forces $F_4$ that are exerted on struts 726 to a point wherein existing struts can handle the side loading force $F_4$, it does have a disadvantage.

In particular, the configuration shown in FIG. 15 adversely affects the designer's flexibility when designing a suspension system. One difficulty with the suspension system of FIG. 15 is its height, which is necessitated by the length of the prior art strut. As will be noted, the spring 728 is placed high, and is disposed generally outside the circumference of the tire. The suspension geometry shown in FIG. 15 is used today because of the inability of presently known struts to handle the side loading forces $F_2$ that would be imposed by a suspension geometry configuration similar to that shown in FIG. 13.

The suspension system shown in FIG. 14 is conceptually similar to that shown in FIG. 15, in so far as the center line 632 of the spring 628 is offset from the center line 730 of the strut 726. However, as it employs the relatively shorter strut of the present invention, it is more compact than the design shown in FIG. 15, thus giving more flexibility to the suspension system designer than the suspension system shown in FIG. 15. Nonetheless, the flexibility inherent in the suspension system 600 of FIG. 14 is less than the flexibility inherent in the design of FIG. 12.

As such, one object of the present invention is to provide a strut which is capable of handling greater side loading forces, so that suspension designers can utilize the suspension geometry similar to that shown in FIG. 13, which gives to the suspension designer, more freedom in positioning the spring 528 and strut 526. This enhanced flexibility gives the designer more options for designing a suspension system that can fit within the existing space provided within the vehicle. As the space available becomes reduced, this flexibility becomes more important.

SUMMARY OF THE INVENTION

In accordance with the present invention, a vehicle suspension strut includes a generally cylindrical housing means having a first end and a second end. The housing means defines a generally longitudinal axis that extends between the first and second ends, and a housing interior for containing a first fluid. A first end closure means which includes a piston receiving aperture is provided for closing the first end of the housing means. A second end closure means is provided for closing the second end of the housing means. A piston means is extendable through the piston receiving aperture, and is movable in an axial direction between a fully collapsed position and an extended position. The piston means includes a first end disposed adjacent to the first end of the housing means and exteriorly of the housing, and a second end. The second end of the piston means is disposed adjacent to the second end of the housing means and within the housing interior. The piston means also includes an insertable portion having a length, L which is substantially inserted into the housing interior when the piston means is in its collapsed position. A piston head means is fixedly coupled to the piston means adjacent to the second end of the piston means. The piston head means includes a plurality of apertures through which the fluid can pass at a controlled rate. A bearing assembly means is disposed within the housing means adjacent to the first end of the housing means for facilitating axial movement of the piston means between its extended and collapsed positions. The bearing assembly means includes at least two axially extending arrays of bearing members that engage the piston over a distance sufficient to absorb radially directed side load forces, thereby substantially eliminating the need for a side load force absorbing member at the second end of the piston means.

In a preferred embodiment, the bearing assembly means includes a first cylindrical ball bushing bearing and a second cylindrical ball bushing bearing that are disposed coaxially in series adjacent to the first end of the housing means. Each of the first and second ball bushing bearings includes a first bushing portion, a second bushing portion, and at least four axially extending arrays of ball bearings that are disposed between the first and second bushing portions.

Additionally, the piston head means preferably comprises a generally thin, sheet like member having a thickness substantially less than its diameter. Also, the strut can include a collar means disposed adjacent to the bearing assembly and a stop means fixedly attached to the piston which is engageable with the collar means for limiting the axial movement of the piston means in an extending direction.

One feature of the present invention is that it includes a bearing assembly that is disposed at the first end of the strut member which includes at least two axially extending arrays of bearing members that engage the piston over a more substantial distance than that known in the prior art. This feature has the advantage of substantially eliminating the need for a side load force absorbing member at the second, interior end of the piston means. By eliminating the side load absorbing member at or near the second end of the piston, the length of the piston, and hence the length of the suspension strut can be reduced, as compared to prior art suspension struts having a similar stroke length.

Another advantage achieved by the use of the ball bearing assembly of the present invention, when coupled with the elimination of the bushing member typically used as the side load absorbing member at the second end of the piston, is that the piston means tends to have a reduced resistance to movement, thus helping to improve the reaction time of the strut absorber, and the smoothness of the movement of the strut.

These and other features and advantages of the present invention will become apparent upon a reading of the detailed description of what is believed by the Applicant at present to be the best mode of practicing the invention.

DETAILED DESCRIPTION

Figure 1:
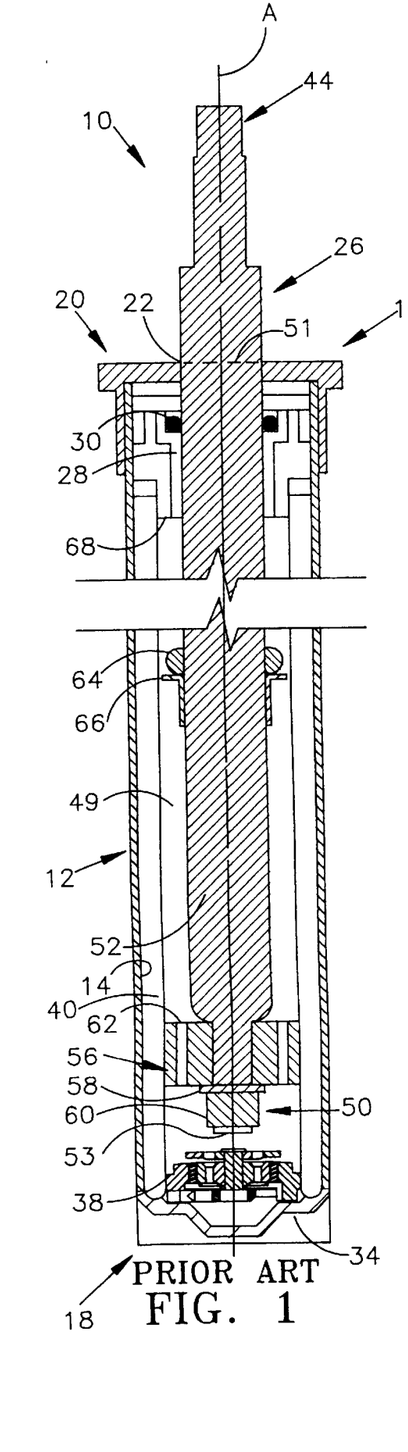
FIG. 1 is a longitudinal sectional view of a typical, prior art strut.
Figure 9:
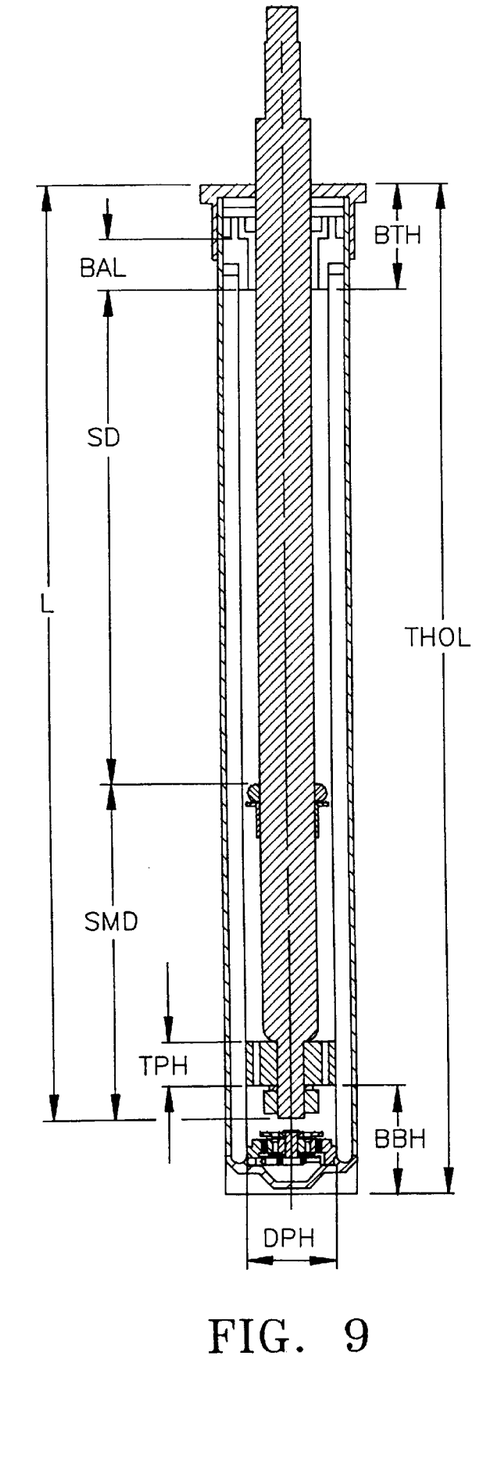
FIG. 9 is a sectional schematic view of the prior art strut of FIG. 1.

A prior art strut assembly 10 is shown in FIGS. 1 and 9 as including a generally cylindrical, constant diameter housing 12 that is preferably formed of steel. The housing 12 has a generally longitudinal axis A, and includes an interior wall 14 that defines the interior of the strut assembly 10. The housing 12 also includes a first end 16 and a second end 18. A first end closure member 20 having a piston receiving aperture 22 closes off the interior of the housing 12 at its first end 16. The piston receiving aperture 22 is provided for slidably receiving a generally cylindrical piston means 26 which is inserted through the piston receiving aperture 22 into the interior of the housing 12, so that when the piston means 26 is in its fully collapsed position (as shown in FIGS. 1 and 9), the majority of the length of the piston means 26 resides within the interior of the housing 12. A bushing 28 is disposed within the interior of the housing 12, just below the first end closure member 20, and is provided for slidably receiving the piston means 26. An O-ring or other suitable seal 30 can be provided between the piston 26, bushing 28, and first closure member 20 for sealing the first end of the interior of the housing 12.

A second end closure member 34 is disposed at the second end 18 of the housing 12 for closing off its second end 18. The second end closure member 34 may include an aperture and bolt arrangement (not shown) for attaching the second end 18 of the strut 10 to an unsprung suspension part such as a steering plate member or steering knuckle. A second end valve member 38 is positioned adjacent to, and interiorly of the second closure member 28. The valve member includes a valve means through which fluid can flow between the interior of the piston, and the space between a cylindrical sleeve 40 and the interior wall 14 of the housing 12.

The generally cylindrical sleeve 40 is disposed generally coaxially with the housing 12 and the piston 26, The sleeve 40 is disposed within the interior of the housing 12 between the interior wall 14 of the housing 12 and the piston 26, and defines a portion of the cylinder 49 in which the piston 26 moves in the housing 12 interior.

The piston 26 includes a first end 44 and a second end 50. The first end 44 is normally disposed exteriorly of the housing 12, and may include a fastener means (not shown) such as an aperture or threads, for fastening the first end 16 of the strut 10 to a fixed (sprung) vehicle member, such as a frame member or body panel (not shown). The second end 50 of the piston 26 is disposed within the interior of the housing 12. The piston 26 also includes an insertable portion, which for purposes of this application is defined as that portion of the piston 26 that is disposed within the housing 12 interior when the piston 26 is in its fully collapsed position. In FIG. 1, the insertable portion is that portion that generally extends between imaginary line 51 and the radially facing surface 53 at the second end 50 of the piston 26.

A second end bushing member 56 is disposed adjacent the second end 50 of the piston means 26, and extends is a radial direction generally between the piston 26 and the cylindrical sleeve 40. The bushing 56 serves as a head for the piston 26.

In typical prior art struts, the second end bushing member 56 is generally somewhat thick, having a typical thickness of between 15 and 17 mm., and a typical diameter of between 32 and 33 mm., thus typically having a thickness to diameter ratio TPH/DPH of between about 0.46 and 0.52. The bushing member 56 is designed to be somewhat thick in order to help absorb the generally radially directed side loading forces that are exerted upon the piston 26. A nut 60 and washer 58 are provided for securing the bushing member 56 onto the piston 26.

The bushing also includes a series of axially extending channels 62 through which fluid can pass at a controlled rate, during movement of the piston both in a collapsing and an extending direction. The interior cylinder 49 of the housing typically contains a fluid (not shown), such as a gas, and/or a liquid (e.g., hydraulic fluid). The channels 62 are designed so that fluid can only pass therethrough at a controlled rate, which is usually a rate designed to slow the movement of the travel of the piston 26.

A stop member is provided which includes a ring seal 64 and a rigid member 66. The stop means is disposed in a spaced relationship from the bushing 56 for limiting the travel of the piston 26 in an axially extending direction. As the piston 26 moves in an axially extending direction, the ring seal 64 of the stop member engages the radially extending, lower surface 68 of the bushing 28. As the stop member is fixedly coupled to the piston 26, the engagement with the ring seal 64 of stop member with lower bushing surface 68 will prevent any further, extending movement of the piston 26. The rigid member 66 of the stop member is disposed directly below the ring seal 64.

Turning now to FIG. 9, the prior art strut 10 will be discussed in relation to the dimensions of the various components.

The piston 26 is moveable from a fully collapsed position, as shown in FIG. 9 to a fully extended position wherein the piston 26 moves axially upwardly (as shown in the drawings) so that a greater portion of the piston becomes disposed exteriorly of the housing 12 interior. In its fully extended position, the stop means 64 and piston 26 have moved upwardly in cylinder 49 to a point where the ring seal 64 of the stop member engages the underside surface 68 of the bushing 28.

The stroke distance of the piston 26 is the distance that the piston 26 can travel in an axial direction from its fully collapsed position (FIG. 9) to its fully extended position. As such, the distance SD—SD shown in FIG. 9 represents the stroke distance SD of the piston 26, as the distance between lines SD—SD is the distance that the piston 26 can move axially, before the ring seal 64 of the stop means engages the underside surface 68 of the bushing 28. For most struts, the stroke distance, SD—SD is dictated by vehicle requirements and suspension geometry.

The piston 26 has an insertable portion, which is defined for purposes of this application, as that portion of the piston which is inserted within the interior of housing 12 when the piston 26 is in its fully collapsed position. The insertable portion has a length L which is that distance between lines L—L of FIG. 9. The typical length L of the insertable portion for most strut assemblies of passenger vehicles is typically between about 400 and 442 mm.

As is shown in FIG. 9, a substantial part of the insertable portion remains within the interior of the housing 12, even when the piston 26 is in its fully extended position. This results in the stroke distance SD being significantly less than the length L of the insertable portion. As such, there exists a significant amount of "dead length", defined herein as the portion of the piston which cannot contribute to its stroke distance. A part of this dead length exists as a result of the distance between the ring seal 64 of the stop means and the lower surface of the bearing 56. Because the piston 26 cannot extend any further than the point at which the ring seal 64 of the stop member engages the bushing lower surface 68, that portion of the piston 26 between the ring seal 64 and the lower surface of the bushing 56 cannot contribute to the stroke distance SD of the piston 26. This unusable, "dead length" portion of the piston 26 extends over a distance SMD, which is shown in FIG. 9 as being the space between lines SMD—SMD. In a typical prior art strut, this distance SMD between the ring seal 64 of the stop member and the lower surface of the bushing 56 is often between 170 and 180 mm. The ratio of the dead length distance SMD to the insertable portion length L of the piston is usually somewhere between about 0.41 to one and 0.43 to one.

The bushing 28 engages the piston 26 along a length BAL which is illustrated as extending between lines BAL—BAL, which represent the top and bottom of the piston engaging surface of the bushing 28. The bushing length BAL of bushings 28 typically used in prior art strut assemblies for passenger vehicles and light trucks is generally between about 15 and 17 mm. The ratio of the bushing length BAL to the length L of the insertable portion of the piston 26 for such vehicles is typically between and 0.03 to one and 0.04 to one.

The prior art suspension strut 10 and its components are constructed in the manner described above for the following reasons. The stroke distance SD is a dimension that the strut 10 needs to achieve in order to accommodate the design of the vehicle's suspension system. Considerations that relate to stroke distance SD result generally from the amount of axial movement that is required to be performed by the piston 26.

In addition to axially directed forces that are exerted on the strut 10, radially directed side-loading forces are also exerted. Radially directed side-loading forces are exerted in a direction R, and are usually exerted most strongly against the first end 44 of the piston 26. (See the discussion above relating to FIGS. 12–15.) The engagement of the upper bushing 28 with the piston 26 causes the piston 26 to pivot about a pivot point defined by the bushing 28 when these radially directed side-loading forces are exerted against the first end 44 of the piston 26. As such, the exertion of a "clockwise" radially directed force against the first end 44 of the piston 26 results in a "counter-clockwise" radial direction of travel of the second end of the piston 26 near nut 60, as the piston 26 pivots about the upper bushing 28. To prevent this pivoting movement, the second end bushing 56 is designed to be relatively thickened, to help absorb the side-loading forces.

In addition to the use of a thickened bushing 56, the ring seal 64 of the stop member is placed at a relatively significant distance, SMD from the bushing 56. The greater the separation, SMD between the ring-seal 64 and the bushing 56, the less side-loading force will be induced on the bushing 56. Nonetheless, substantial side load forces are still exerted on bushing 56. As such, the bushing 56 needs to be designed to absorb such radially directed side-loading forces. With respect to some other dimensions, the Total Housing Length (THOL) is about 474 mm; the distance from the bottom of the upper bearing (or bushing) assembly to the top of the housing (BTH) is about 40 mm; and the distance from the bottom of the housing to the bottom of the lower bushing or bearing (BBH) is about 44 mm.

The suspension strut 100 of the present invention is shown in FIG. 2, 4–8 and 10 as including a generally cylindrical, metal housing 102 having a first end 104, a second end 106 and a longitudinal axis A. Unlike prior art strut 10, which has a generally constant diameter cylindrical housing, the housing 102 of the present invention strut 100 includes a relatively reduced diameter first portion 108 that is disposed adjacent to the first end 104 of the housing 102, and a relatively enlarged diameter second portion 110 that is disposed adjacent to the second end 106 of the housing 102. A frusto-conical shoulder portion 112 is provided as a transition portion between the relatively enlarged diameter second portion 110 and the relatively reduced diameter first portion 108.

Figure 2:
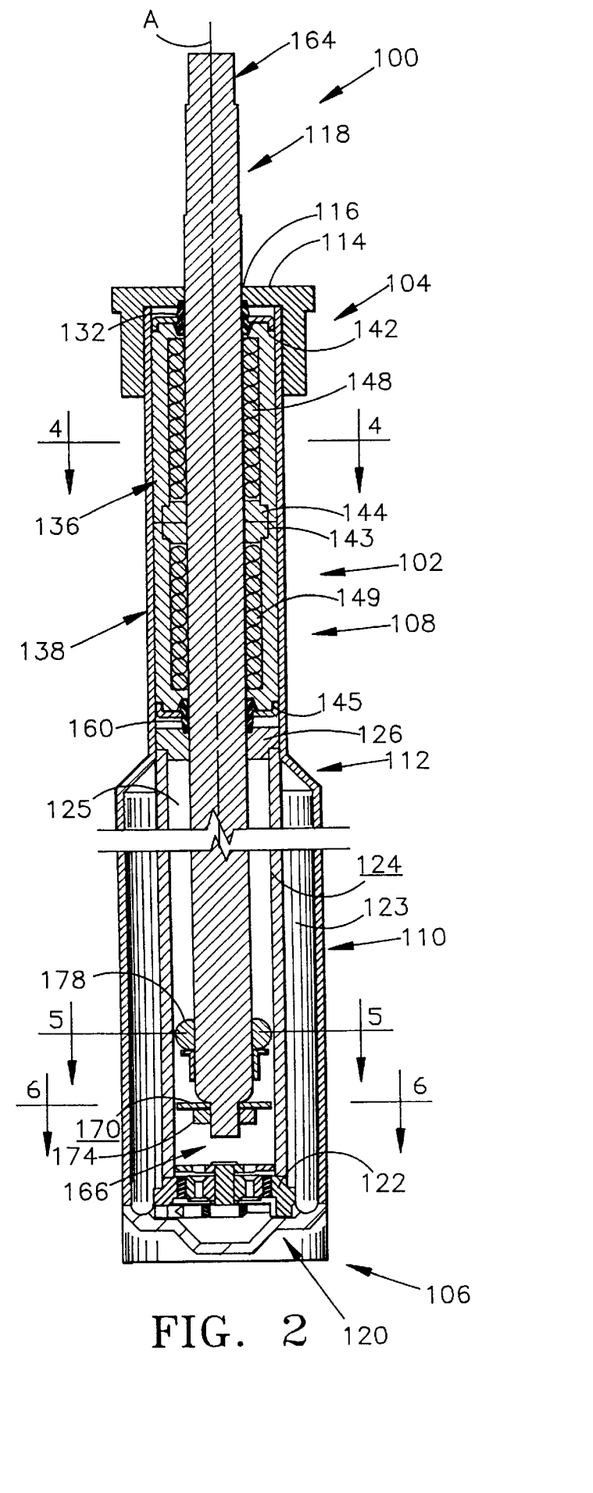
FIG. 2 is a longitudinal sectional view of the strut of the present invention.

A first end closure member 114 is provided for closing and sealing the first end 104 of the housing 102. The first end closure member 114 includes a centrally disposed, piston receiving aperture 116 which is provided for snugly, slidably receiving a generally cylindrical piston 118. A second end closure member 120 closes the second end 106 of the housing 102. The second end closure member 120 may include an aperture and/or bolt arrangement (not shown) for enabling the second end 106 of the housing 102 to be coupled to a vehicle part, such as a vehicle suspension part assembly. A valve containing second end valve member 122, similar to second end valve member 38 is disposed adjacent to, and interiorly of the second closure member 120. The second end closure member 120 includes an axially extending radially facing rim, for snugly receiving, and properly positioning a radially facing, axially extending surface of the second end valve member 122. The second end valve member 122 also includes a relatively recessed ridge for serving as a seat for a cylindrical sleeve 124 that defines the cylinder 125 in which the piston head 170 moves. The ridge includes both an axially extending radially facing surface, and a radially extending axially facing surface. The second end valve member 122 includes a valve to permit fluid to flow between cylinder interior 125 (the area in which the piston 170 travels), and the space 123 defined between the cylindrical sleeve 124 and the interior surface of the metal housing 102 (see FIG. 5).

The cylindrical sleeve 124 is disposed generally co-axially with the housing 102, and extends generally between the second end valve member 122 and a collar member 126. Collar member 126 also includes a ridge having an axially facing surface and a radially facing surface, for providing a seat for the first (upper) end of the cylindrical sleeve 124.

A lip seal 132 is disposed underneath the axially facing surface of the first end closure member 114 for preventing the escape of fluid from the interior of the housing 102. A first cylindrical ball bushing bearing 136 is disposed below the lip seal 132, and a second cylindrical ball bushing bearing 138 is disposed co-axially with the first cylindrical ball bushing bearing 136. The second cylindrical ball bushing bearing 138 is disposed adjacent to, below, and co-axially with the first cylindrical ball bushing bearing 136, and is generally identical in configuration therewith. Each of the first and second cylindrical ball bushing bearings 136, 138 include a first bushing portion 142, 143, respectively that is disposed adjacent to the first end of the respective ball bushing bearings 136, 138, and a second bushing portion 144, 145 that is disposed adjacent to the second end of the respective first and second cylindrical ball bushing bearings 136, 138. Alternatively, four seals could be used rather than the two seals 132, 160 shown in the drawings. Four lip seals would be used by placing one at each end of each of the two bearings 136, 138. Regardless of whether four or two seals are used, the seals should comprise lip seals of the type shown at page 50 of the 1993 Thomson Industries, Inc. Linear Motion Technology Guide, published by Thomson Industries Inc. of Port Washington, N.Y. 11050 (the "Thomson LMT Guide").

Figures 3, 4, 5:
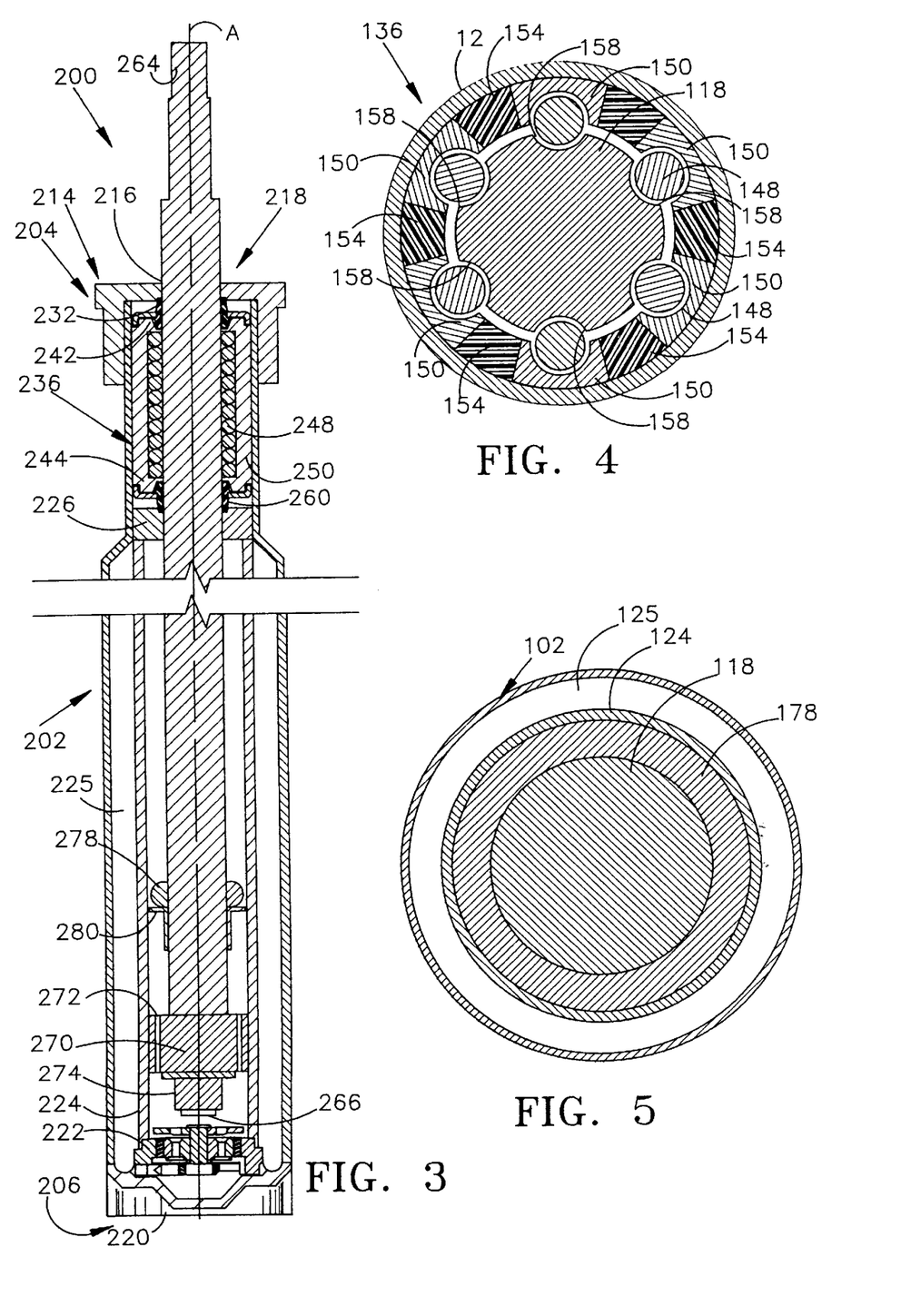
FIG. 3 is a longitudinal sectional view of an alternate embodiment strut of the present invention.
FIG. 4 is a sectional view taken along lines 4—4 of FIG. 2.
FIG. 5 is a sectional view taken along lines 5—5 of FIG. 2.
Figure 7:
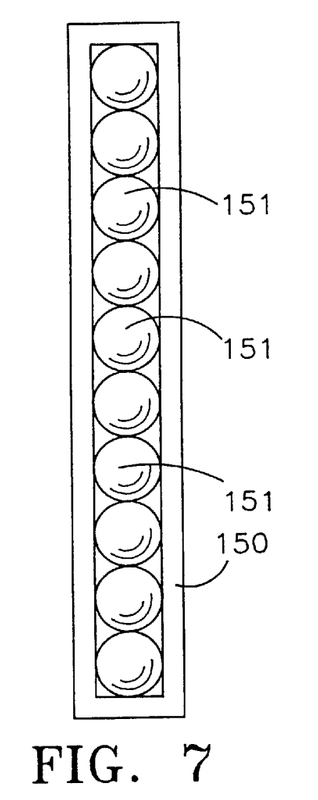
FIG. 7 is an enlarged, elevation view of an array of bearing members of the bearing assembly of the present invention.
Figure 8:
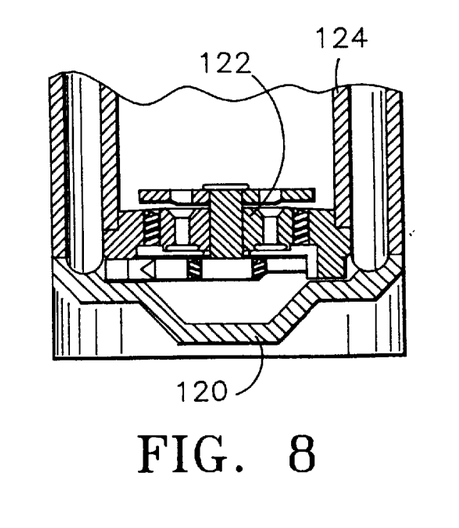
FIG. 8 is an enlarged sectional view of the second end of the strut assembly.

As best shown in FIGS. 2, 4 and 7, each of the cylindrical ball bushing bearings 136, 138 includes at least two, and preferably six generally linear, axially extending arrays of ball bearing members. The arrays 148, 149 of ball bearing members extend generally between the first 142, 143 and second 144, 145 bushing portions of the first and second ball bushing bearings 136, 138. As shown in FIG. 7, the linear array may include a large number of ball bearings 151 (e.g. 10). A race 150 is provided for containing each of the linear arrays 148, 149 of ball bearings.

As best shown in FIG. 4, the preferred cylindrical ball bushing bearing includes six races 150, each containing their own linear array, e.g. 148 of ball bearings. The six linear arrays 148 are evenly spaced around the circumferential periphery of the piston 118, generally being separated by 60°. The cylindrical ball bushing bearings 136, 138 also include six spacer portions 154 that are positioned between adjacent races 150. Examples of cylindrical ball bushing bearings that will function in connection with the present invention are THOMSON LINEAR MOTION SUPER PLUS BALL BEARINGS and THOMSON LINEAR MOTION MULTI-TRACK BALL BUSHING BEARINGS, which are available from Thomson Industries, Inc. of Port Washington, N.Y., 11050, and which are shown on pages 52 and 53 of the 1993 Thomson LMT Guide.

As best shown in FIG. 4, the piston 118 includes a series of axially extending channels 158 that are generally concavely arcuate in cross section. Six channels 158 are provided, one for each of the six linear arrays 148 of bearings. Through this arrangement, the piston 118 is prevented from rotating within the cylindrical ball bushing bearings 136, 138 and hence within the housing 102. Through the use of the ball bushing bearing members 136, 138, the piston 118 is supported by the ball bushing bearings 136, 138 over a more substantial length than is provided by conventional bushings, e.g. 28 of FIG. 1. Additionally, the ball bearings 151 reduce friction with the piston 118, and therefore result in less resistance to piston 118 movement than is achievable by a bushing having a similar length.

A second lip seal 160 is interposed between the second end of the second ball bushing bearing 138 and the upper axially facing surface of the collar 126. Lip seal 160 is preferably a lip seal of the type shown at page 50 of the Thomson LMT Guide. Lip seal 160 also helps to prevent fluid leakage from the interior cylinder 125 of the housing 102, thus helping to prolong the life of the suspension strut.

Figure 6:
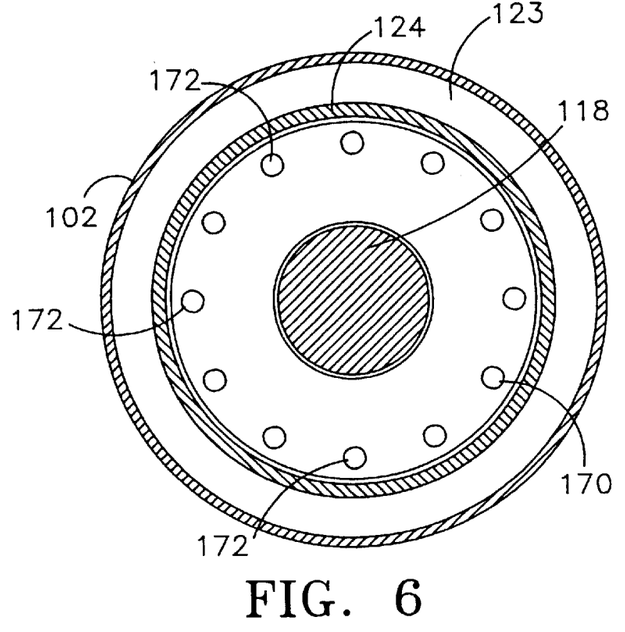
FIG. 6 is a sectional view taken along lines 6—6 of FIG. 2.

The piston 118 includes a relatively thin piston head means 170 disposed near the second end 166 of the piston 118. The piston head 170 is shown in FIGS. 2 and 6 as being a generally thin, sheet-like member that has a torus shape similar to a washer. The piston head 170 is preferably made from a steel material having a thickness of between about 3 and 4 mm. The piston head 170 extends radially generally between the piston 118 and the cylindrical sidewall 124 (with some clearance there-between) and has an outer diameter of between about 29 and 30 mm. This places the thickness to diameter ratio of the piston head generally in the range about 0.10 to one and 0.13 to one.

As shown in FIG. 6, the piston head 170 includes a series of apertures 172 through which a fluid, such as a gas, or a hydraulic fluid can pass at a controlled rate. Insofar as the rate at which fluid passes, and the functions served by the apertures, the apertures 172 generally perform the same function as that performed by channels 62 of bushing 56 of the prior art strut assembly 10 of FIG. 1. A nut 174 is provided for securing the piston head 170 onto the second end 166 of the piston 118.

Stop member 178 is generally similar to stop member 64 of piston 10 of FIG. 1 and is disposed in a spaced relation from the piston head 170. However, it will be noticed that the distance between the stop member 178 and piston head 170 is substantially less than the distance between ring seal 64 of the stop member and bushing 56 of FIG. 1. Typically, the space between the stop member 178 and bushing 170 will be between about 26 and 28 mm.

The dimensional and functional relationships of the various components of the strut 100 of FIG. 2 will now be described with reference to FIG. 10.

Figure 10:
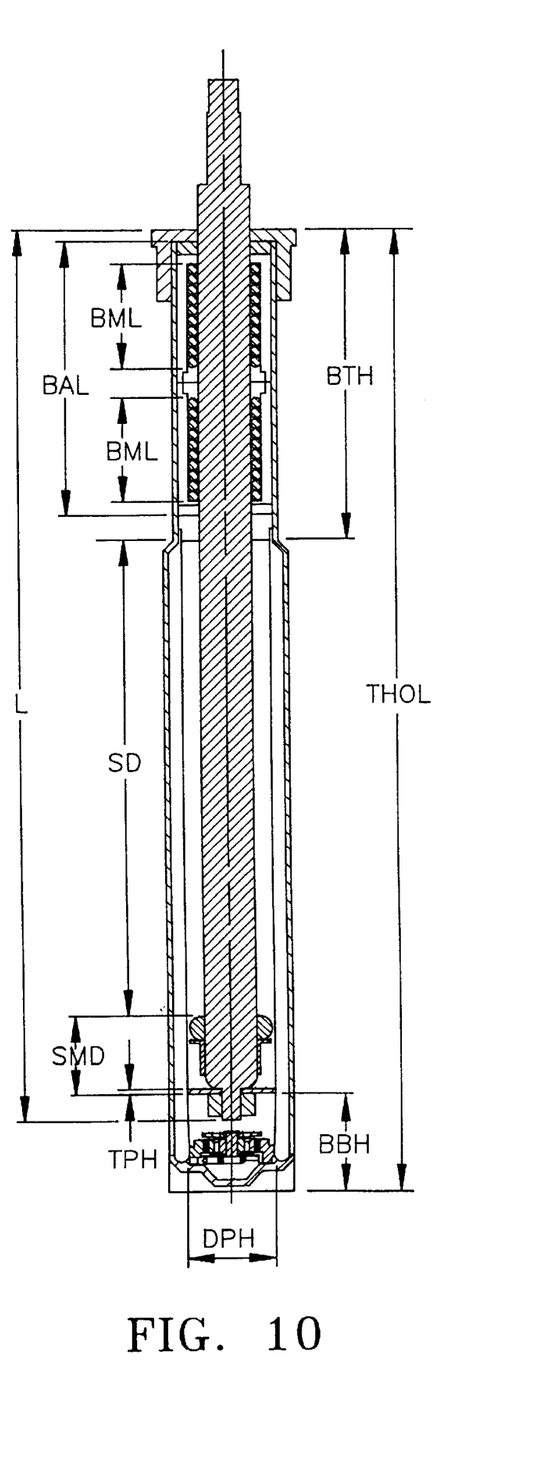
FIG. 10 is a schematic, sectional view of the strut of the present invention shown in more detail in FIG. 2.

The stroke distance of the piston 118 is the distance shown in FIG. 10 between lines SD—SD, and corresponds generally to the distance that the piston 118 can travel in an axial direction between its fully collapsed position, as shown in FIG. 10, and its fully extended position wherein the stop member 178 engages the underside surface of collar 126. The piston 118 also includes an insertable length L which, for purposes of this application will be defined as the length of the piston 118 within the interior of housing 102 when the piston is in its fully, collapsed position, and therefore maximally inserted into the interior of the housing 102. As shown in FIG. 10 length L is that distance from the upper surface of the first closure member 114 to the radially facing lower surface of the second end 166 of the piston adjacent to nut 174. In a typical strut assembly for a vehicle or light truck, the insertable length of the piston will generally be between 376 and 400 mm.

Because the stop member 178 and piston head 170 are placed closer together than they are in the prior art piston 10, the unusable, "dead length" portion of the piston 118 is substantially reduced as compared to the prior art piston shown in FIG. 9. The unusable length of piston 118 of FIG. 10 is that space between lines SMD—SMD, the space generally between the upper surface of the stop member 178 and the lower surface of the piston head 170. Typically, this distance in a vehicle or light truck strut is between about 26 and 30 mm. It should be noted that this dead space SMD is also reduced by virtue of the thinness of the piston head 170, as compared to relatively thicker bushing 56 of the prior art strut assembly.

Turning now to the first end 104 portion of this strut 100, it will be noted, that the bearing assemblies 136, 138 extend along a relatively greater length of the piston 118 than bushing 28 of prior art strut 10. Preferably, each bearing has a vertical height of about between 56 and 60 mm, so that it extends along the piston for this length. As the first and second cylindrical ball bushing bearing assemblies 136, 138 are placed in an end to end, coaxial relationship, the combined length of both bearing assemblies is preferably between 114 and 120 mm. This distance is represented in FIG. 10 as the distance between lines BAL—BAL.

As set forth in more detail above, each of the bearing assemblies 136, 138 includes a first bushing portion 142, 143 respectively disposed adjacent to the first end of the respective bearing assemblies 136, 138; a second bushing portion 144, 145 disposed adjacent to the second end of the first and second bushing bearing assemblies 136, 138 and a plurality of linear arrays of ball bearing members 148, 149 disposed between first bushing portions 142, 143 and of the second bushing portions 144, 145. As such, the ball bearings extend over the large majority of the length of each of the ball bushing bearing assemblies 136, 138, but not the entire length thereof. The distance BML1 between lines BML1—BML1 is that distance over which the actual ball bearing array 148 engage the piston 118. Similarly, distance BML2, the distance between lines BML2—BML2, is that distance over which the linear array 149 of ball bearings of the second cylindrical ball bushing bearing 138 engage the piston 118. The combined length of the two ball bushing assemblies 136, 138 over which the bearing arrays 148, 149 engage the piston 118 is then the combined distances, BML1+BML2 of the two cylindrical ball bushing bearings 136, 138.

The bearings of each of the two ball bushing bearing assemblies extend axially along the length of the piston 118 for a distance of between 40 and 42 mm. The combined length (BML1+BML2) over which the bearings of both ball bushing bearing assemblies 136, 138 engage the piston is preferably between about 80 and 84 mm. It will be appreciated that although in the drawings the two bearing assemblies 136, 138 are shown to be generally identically-sized bearing assemblies, it would be possible to achieve the same overall bearing length, BAL and/or BML by using different sized bearings such as a relatively shorter first cylindrical ball bushing bearing 136, and a relatively longer second ball bushing bearing assembly 138.

One feature that distinguishes the present invention from the prior art is the difference in the ratios between the various bearing lengths and the insertable length of the piston. For example, in the strut assembly 100 of the present invention, the total length over which the bearing assemblies 136, 138 extend, as a proportion of the insertable length L (BAL/L) is generally between about 0.30 to one and 0.32 to one. Similarly, the ratio of the axial distance BML over which the ball bearing members extend (which comprises BML1+BML2), to the insertable length L is relatively large. The ratio BML/L of the strut member 100 of the present invention is preferably between about 0.20 to one and 0.25 to one. As stated above, the ratio between the dead length distance SMD and the length of the insertable portion L is less than prior art struts. In strut 100, the dead length distance SMD is preferably between about 20 and 30 mm., which is about 6.5% to 8.5% as great as the distance SMD of the prior art strut.

Another difference relates to the relative thickness of the piston head 170, when compared to bushing 56 of prior art strut 100. Because the bearing assemblies 136, 138 extend over a relatively longer length of piston 118, the bearing assemblies 136, 138 can absorb substantially all of the radially directed side loading forces on the piston 118. Piston head 170 does not need to be designed to absorb such side loading forces. As such, piston head 170 can be designed to be thinner than bushing 56. The ratio of the thickness TPH to the diameter DPH of the piston head of the present invention is preferably between about 0.06 to one and 0.10 to one.

Another impact of these differences in dimension between the strut 100 of the present invention and the strut 10 of the prior art is that the stop member 178 can be placed more closely to the piston head 170, thus reducing dead space, Further, the overall length of the housing 112 of the strut 100 can be reduced when compared to the length of the housing of strut 10 because of the reduction of dead space in the strut 100. This overall reduction in length can occur while maintaining comparable stroke distances. It has been found by the applicant that on one strut member 100, of the present invention having a stroke length of 210 mm, the overall length of the housing could be reduced from 474 mm with a prior art strut assembly 10, to just 408 mm with a strut 100 of the present invention, thus saving 66 mm. in length while still maintaining the same stroke distance SD of 210 mm.

Figure 11:
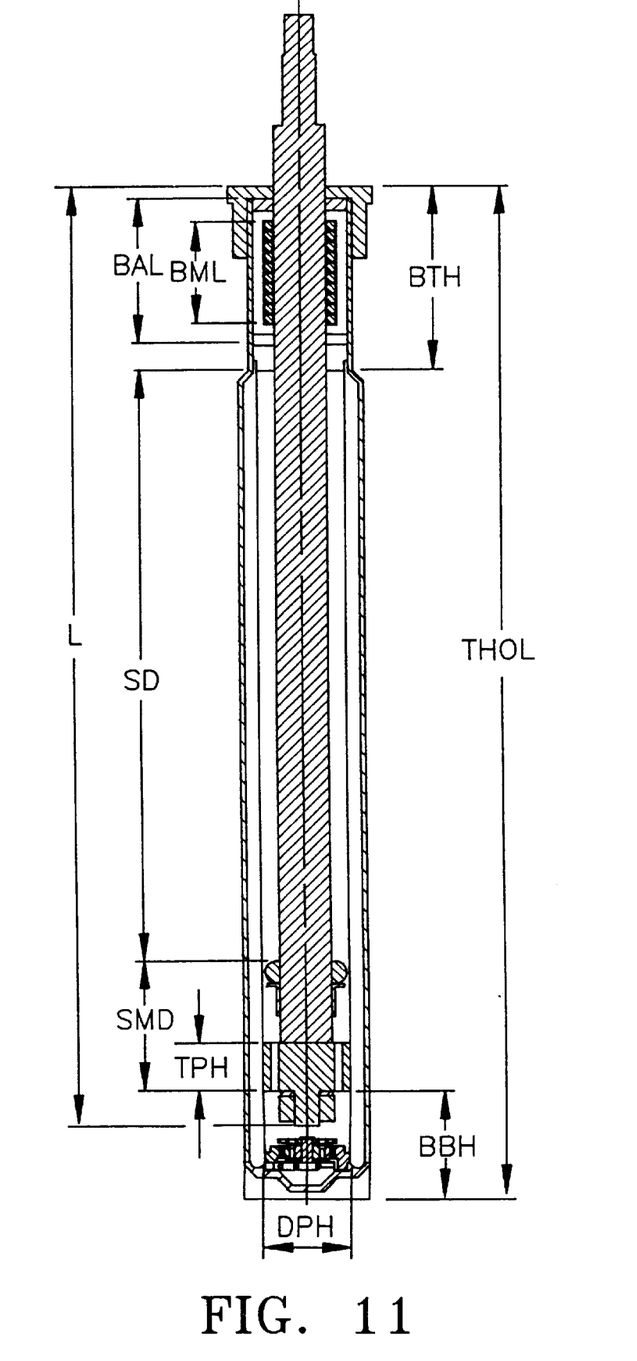
FIG. 11 is a side schematic sectional view of the alternate embodiment strut shown in FIG. 3.

An alternate embodiment suspension strut 200 of the present invention is shown in FIGS. 3 and 11 and includes a generally cylindrical, metal housing 202 having a first end 204 a second end 206 and a longitudinal axis A. Similar to prior art strut 10, strut 200 has a generally constant diameter cylindrical housing. A first end closure member 214 is provided for closing and sealing the first end 204 of the housing 202. The first end closure member 214 includes a centrally disposed, piston receiving aperture 216 which is provided for snugly, slidably receiving a generally cylindrical piston 218. A second end closure 220 closes the second end 206 of the housing 202. The second end closure member 220 may include an aperture and/or bolt arrangement (not shown) for enabling the second end 206 of the housing to be coupled to a vehicle part, such as a vehicle wheel assembly.

A second end valve member 222 is disposed adjacent to, and interiorly of the second closure member 220. The second end valve member 222 includes a ridge having a radially facing surface and an axially facing surface for snugly receiving, and properly positioning the lower end of cylindrical sleeve 224. Cylindrical sleeve 224 is disposed generally coaxially with the housing 202, and extends generally between the second end valve member 222 and the collar member 226, and defines a portion of the cylinder 225 in which the piston 218 moves. Collar member 226 also includes a ridge having an axially facing surface and a radially facing surface for providing a seat for the first (upper) of the cylindrical sleeve 224. A first lip seal 232, which is preferably a lip seal of the type shown on page 50 of the 1993 Thomson LMT Guide, is disposed underneath the axially facing surface of the first end closure member 214 for preventing the escape of fluid (not shown) from the cylinder 225.

The first cylindrical ball bushing bearing 236 is disposed axially inwardly of the first lip seal 232. The first cylindrical ball bushing bearing 236 includes a first bushing portion 242 that is disposed adjacent to the first end of the ball bushing bearing 236, and the second bushing portion 244 that is disposed adjacent to the second end of the first cylindrical ball bushing bearing 236. Ball bushing bearing 236 is generally similar to ball bushing bearing 136 of strut 100, and includes at least two, and preferably six axially extending linear arrays 248 of ball bearing members. The arrays of ball bearing member 248 extend generally between the first and second bushing portions 242, 244. A race is provided for containing each of the linear arrays 248 of ball bearings.

Cylindrical ball bushing bearing 236 preferably has an axially length BAL of between about 57 and 59 mm. Additionally, each of the linear arrays 248 of bearings extend along the piston for a length BML of about 40 and 42 mm. The piston 218 is configured similarly to piston 118, as it includes a series of axially extending channels (not shown) which are generally concavely arcuate in cross-section.

A second lip seal 260 is interposed between the second end of the cylindrical ball bushing bearing 236 and the upper axially facing surface of the collar 226. The piston 218 includes a piston head 270 that includes a series of axially extending channels 272 through which a fluid can pass at a controlled rate. In a typical strut assembly for a vehicle or light truck, the piston head 270 will have an outer diameter of between about 32 and 33 mm, and a thickness of about 15 and 17 mm. This places the thickness to diameter ratio of piston head 270 generally in the range between about 0.46 to one and 0.52 to one.

A nut 274 is provided for securing the piston head 270 onto the second end 266 of the piston 218. A stop member 278 is disposed in a spaced relation from the piston head 270. Stop member 278 may include a rigid member 280.

The dimensional and functional relationships of the various components of the strut 200 of FIG. 3 will now be described with reference to FIG. 11.

The stroke distance of the piston 218 is the distance shown in FIG. 11 between lines SD—SD. The insertable length L of the piston is the distance between lines L—L, and is defined as the length of the piston that can be contained fully within the interior of the housing 202 when the piston 218 is in its fully collapsed position. In a typical strut assembly for a vehicle or light truck, the insertable length L of the piston will generally be between 333 and 338 mm, and the stroke distance SD will be typically between approximately 21.0 and 21.5 cm.

The unusable length of piston 218 of FIG. 11 is that space between lines SMD-SMD, the space generally between the upper surface stop member 278 and the lower surface of the piston head 270. Typically, this distance for a strut configured according to FIGS. 3 and 11, in a vehicle or light truck is between 40 and 45 mm. The axial distance over which the bearing assembly 236 extends is shown by lines BAL—BAL, and is preferably between about 57 and 59 mm. The axial distance over which the bearing members of the bearing array 248 extend is that distance BML—BML, and is between about 40 and 42 mm. Distance BML can also be viewed as distance BAL minus the space occupied by the first and second bushing portions 242, 244 of the cylindrical ball bushing bearing 236.

The ratio of the total length BAL over which the bearing assembly 236 extends, as a portion of the insertable portion length L (BAL/L) is generally about 0.17 to one for the embodiment shown in FIG. 11 having a 210 mm stroke length. Similarly, the ratio of the axial distance BML over which the ball bearing arrays 248 extend to the insertable portion length L (BML/L) is about 0.12 to one.

The ratio between the dead length distance SMD and the length of the insertable portion L is about 0.12 to one. The ratio of the thickness TPH to the diameter DPH of the piston head 270 of the embodiment shown in FIG. 3 is about 0.46 to one.

The use of the bearing 236 the embodiment of FIG. 11 provides a substantial advantage over the prior art strut 10, because its relatively enhanced ability to accept and deal with side-loading forces, reduces the side-loading forces that are exerted on either the piston head 270 or the stop member 278.

To better help describe and illustrate the differences in the respective sizes, lengths and ratios of components of the present invention, a chart entitled "Representative Size and Ratio Chart" is presented below for the prior art device shown in FIG. 9 and for the inventive devices shown in FIGS. 10 and 11. In this chart, three representative struts are compared having identical stroke lengths of 210 mm., and which could be used on comparable vehicles.

In the chart, the following abbreviations have the following meanings, which are defined also in more detail above:

1. L=the length of the insertable portion of the piston
2. THOL=the total housing length 3. SD=stroke distance of the piston
4. SMD=length of the "dead length" portion of the piston
5. BAL=total length of the bearing members on the piston
6. BML=total length over which the bearing members (e.g. ball bearings) engage the piston
7. BML1=length over which the bearing members of the first bearing (of FIG. 10) engage the piston
8. BML2=length over which the bearing members of the second bearing (of FIG. 10) engage the piston
9. TPH=the thickness of the lower bushing
10. DPH =the diameter of the lower bushing
11. TPH/DPH=the ratio of the thickness to the diameter of the lower bushing
12. BAUL=the ratio of BAL/L
13. BML/L=the ratio of BM/L
14. SMD=the distance from the stop means of the piston to the lower bushing of the piston
15. SMD/L=the ratio of SMD/L
16. BTH=the distance from the bottom of the upper bearing assembly to the top of the housing
17. BBH=the distance from the bottom of the lower bushing to the bottom of the housing REPRESENTATIVE SIZE AND RATIO CHART
(all dimensions except ratios given in millimeters:
all ratios given as the ratio to 1 (e.g. .47 = .47 to 1)

| Dimension of Interest | FIG. 9 (Prior Art) | FIG. 10 (1st embodiment) | Difference between FIGS. 10 and 9 | FIG. 11 (2nd embodiment) | Difference between FIGS. 11 and 9 |
|---|---|---|---|---|---|
| L | 442 | 376 | −66 | 333 | −109 |
| THOL | 474 | 408 | −66 | 365 | −109 |
| SD | 210 | 210 | 0 | 210 | 0 |
| BAL | 15 | 114 | 99 | 57 | 42 |
| BML | 15 | 80 | 65 | 40 | 25 |
| BML1 | N/A | 40 | N/A | 40 | N/A |
| BML2 | N/A | 40 | N/A | N/A | N/A |
| TPH | 15 | 3 | −12 | 15 | 0 |
| DPH | 32 | 31 | −1 | 32 | 0 |
| TPH/DPH | 0.469 | 0.097 | 21% | 0.469 | 100% |
| BAL/L | 0.032 | 0.303 | 947% | 0.17 | 531% |
| BML/L | 0.034 | 0.213 | 626.5% | 0.12 | 353% |
| SMD | 180 | 26 | −154 | 40 | −140 |
| SMD/L | 0.407 | 0.069 | 17% | 0.12 | 29.5% |
| BTH | 40 | 128 | 88 | 71 | 31 |
| BBH | 44 | 44 | 0 | 44 | 0 |

Having described the invention in detail, it will be appreciated that the variations and modifications exist within the scope and spirit of the claims appended hereto.

What is claimed is:

1. A vehicle suspension strut comprising
a generally cylindrical housing including a first end and a second end, the housing defining a generally longitudinal axis extending between the first and second ends, and a housing interior for containing a fluid,
a first closure for closing the first end of the housing, the first closure including a piston receiving aperture,
a second closure for closing the second end of the housing,
a piston extendable through the piston receiving aperture, the piston being movable in an axial direction between a fully collapsed position and an extended position, the piston including:
a first end disposed adjacent to the first end of the housing and exteriorly of the housing exterior,
a second end disposed adjacent to the second end of the housing and within the housing interior, and
an insertable portion having a length L, the insertable portion being that portion of the piston which is disposed within the housing interior when the piston is in the fully collapsed position,
a piston head fixedly coupled to the piston adjacent the second end thereof, the piston head including a plurality of apertures through which the fluid can pass at a controlled rate, and
a bearing assembly disposed within the housing abutting against the first closure for facilitating axial movement of the piston between its extended and collapsed positions, the bearing assembly including at least two axially extending arrays of bearing members that engage the piston over a distance sufficient to absorb radially directed side load forces thereby substantially eliminating the need for a side load force absorbing member at the second end of the piston.

2. The suspension strut of claim 1 wherein the bearing assembly comprises a cylindrical ball bushing bearing having at least four generally axially extending arrays of bearings.

3. A vehicle suspension strut comprising:
1. a generally cylindrical housing including a first end and a second end, the housing defining a generally longitudinal axis extending between the first and second ends, and a housing interior for containing a fluid,
2. a first closure for closing the first end of the housing, the first closure including a piston receiving aperture,
3. a second closure for closing the second end of the housing,
4. a piston extendable through the piston receiving aperture, the piston being movable in an axial direction between a fully collapsed position and an extended position, the piston including:
   a. a first end disposed adjacent to the first end of the housing and exteriorly of the housing exterior,
   b. a second end disposed adjacent to the second end of the housing and within the housing interior, and
   c. an insertable portion having a length L.
5. a piston head fixedly coupled to the piston adjacent the second end thereof, the piston head including a plurality of apertures through which the fluid can pass at a controlled rate, and 6. a bearing assembly disposed within the housing adjacent to the first end thereof for facilitating axial movement of the piston between its extended and collapsed positions, the bearing assembly comprising a first cylindrical ball bushing bearing and a second cylindrical ball bushing bearing disposed in series adjacent to the first ball bushing bearing, each of the first and second cylindrical ball bushing bearings including a first bushing portion, a second bushing portion and at least six axially extending arrays of ball bearings disposed between the first and second bushing portions, the axially extending arrays of bearing engaging the piston over a distance sufficient to absorb radially directed side load forces thereby substantially eliminating the need for a side load force absorbing member at the second end of the piston.

4. The suspension strut of claim 3 wherein each of the first and second ball bushing bearings have a first end and a second end, the first end of the first ball bushing bearing being disposed adjacent to the first end closure member, and the first end of the second ball bushing bearing being disposed adjacent to the second end of the first ball bushing bearing, and coaxial with the first ball bushing bearing.

5. The suspension strut of claim 1 wherein the bearing assembly extends along a length BAL of the insertable portion wherein BAL/L is between about 0.17 and 0.32.

6. The suspension strut of claim 1 wherein the bearing assembly extends along a length BAL of the insertable portion, wherein BAL/L is between about 0.30 and 0.32.

7. The suspension strut of claim 1 wherein the bearing assembly extends along a length BAL of the insertable portion, wherein the length L of the insertable portion is between about 330 mm and 380 mm, and the length, BAL of the bearing assembly is between about 55 and 120 mm.

8. The suspension strut of claim 1 wherein the bearing assembly extends along a length BAL of the insertable portion, wherein the length L of the insertable portion is between about 376 and 400 mm, and the length BAL of the bearing assembly is between about 114 and 120 mm.

9. The suspension strut of claim 1 wherein the at least two axially extending arrays of bearing means extend over a length BML of the insertable portion, wherein BML/L is between about 0.1 and 0.24.

10. The suspension strut of claim 1 wherein the at least two axially extending arrays of bearing members extend over a length BML of the insertable portion, wherein BML/L is between about 0.20 and 0.24.

11. The suspension strut of claim 1 wherein the piston head is a generally thin member having a thickness substantially less than its diameter.

12. The suspension strut claim 1 wherein the piston head has a thickness of between about 2 and 5 mm, and a diameter of between about 30 and 34 mm.

13. The suspension strut of claim 1 wherein the piston head is a generally thin member having a thickness TPH and a diameter DPH, wherein TPH/DPH is between about 0.06 and 0.10.

14. The suspension strut of claim 1 wherein the housing is a unitarily formed member, and the strut further comprising a generally cylindrical sleeve disposed within the housing interior generally coaxial with the bearing assembly and the piston, wherein the piston head extends radially between the sleeve and the piston.

15. The suspension strut of claim 1 further comprising a stop disposed on the piston and extending radially outwardly thereof, and a collar disposed adjacent the bearing assembly, the stop being engageable with the collar for limiting axial movement of the piston in an extending direction, and the stop being positioned on the piston in a spaced relationship with the piston head.

16. The suspension strut assembly of claim 15 wherein the stop is positioned at a distance SMD from the piston head, wherein SMD/L is between about 0.06 and 0.2.

17. The suspension strut of claim 15 wherein the stop is positioned at a distance SMD from the piston head, wherein SMD/L is between about 0.06 and 0.12.

18. The suspension strut of claim 15 wherein the stop is positioned at a distance SMD from the piston head of between about 25 and 50 mm.

19. The suspension strut of claim 1 wherein the housing is a unitarily formed member which includes:
  a relatively enlarged diameter portion disposed adjacent to the second end,
  a relatively reduced diameter portion disposed adjacent the first end, and
  a shoulder portion disposed between the relatively enlarged diameter portion and the relatively reduced diameter portion, and
  further compromising a radially extending stop fixedly coupled to the piston for movement therewith, and
  a radially extending collar disposed adjacent the bearing assembly and the shoulder portion, the stop being engageable with the collar for limiting axial movement of the piston in an extending direction.

20. The suspension strut of claim 1 wherein the fluid comprises a gas.

21. The suspension strut of claim 1 wherein the fluid comprises hydraulic fluid.

22. A vehicle suspension strut comprising
  a generally cylindrical housing including a first end and a second end, the housing defining a generally longitudinal axis extending between the first and second ends, and a housing interior for containing a fluid,
  a first closure for closing the first end of the housing, the first closure including a piston receiving aperture,
  a second closure for closing the second end of the housing,
  a piston extendable through the piston receiving aperture, the piston being movable in an axial direction between a fully collapsed position and an extended position, the piston including:
    a first end disposed adjacent to the first end of the housing and exteriorly of the housing interior,
    a second end disposed adjacent to the second end of the housing and within the housing interior, and
    an insertable portion having a length L, the insertable portion being that portion of the piston which is disposed within the housing interior when the piston is in the fully collapsed position,
  a piston head fixedly coupled to the piston adjacent the second end thereof, the piston head comprising a generally thin member having a thickness substantially less than its diameter and including a plurality of apertures through which the fluid can pass, the piston head extending radially outward from the piston and leaving a clearance space between the perimeter of the piston head and the housing,
  a stop disposed on the piston and extending radially outwardly therefrom, a radially extending collar disposed between the piston and the housing, the stop being engageable with the collar for limiting the axial movement of the piston in an extending direction, a cylindrical ball bushing bearing assembly disposed within the housing assembly abutting against the first closure for facilitating axial movement of the piston between its extended and collapsed positions, the bearing assembly including at least four axially extending arrays of bearing members for engaging the piston over a distance sufficient to absorb radially directed side load forces thereby eliminating the need for a side load force absorbing member at the second end of the piston.

23. The suspension strut of claim 22 wherein the bearing assembly extends along a length BAL of the insertable portion, wherein BAL/L is between about 0.30 and 0.32.

24. The suspension strut of claim 23 wherein the piston head is a generally thin member having a thickness TPH and a diameter DPH, wherein TPH/DPH is between about 0.06 and 0.10.

25. The suspension strut of claim 24 wherein the stop is positioned at a distance SMD from the piston head, wherein SMD/L is between about 0.06 and 0.12.

26. The suspension strut of claim 25 wherein the stop is generally torus shaped, and extends radially between the piston and the housing.

27. The suspension strut of claim 26 wherein the housing includes a sleeve disposed generally coaxially with the bearing assembly and the piston, wherein the piston head and stop each extend radially from the piston towards the sleeve leaving clearance between the piston head and the sleeve.

* * * * *